United States Patent
Le Gall et al.

(10) Patent No.: US 9,142,135 B2
(45) Date of Patent: Sep. 22, 2015

(54) METHOD AND DEVICE FOR AUTOMATICALLY DETERMINING AN OPTIMIZED APPROACH AND/OR DESCENT PROFILE

(71) Applicant: AIRBUS OPERATIONS S.A.S., Toulouse (FR)

(72) Inventors: Virginie Le Gall, Tournefeuille (FR); Alexandre Buisson, Toulouse (FR); Pierre-Xavier Catinat, Toulouse (FR); Valentin Vincent, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/279,418

(22) Filed: May 16, 2014

(65) Prior Publication Data

US 2014/0343760 A1 Nov. 20, 2014

(30) Foreign Application Priority Data

May 17, 2013 (FR) ...................................... 13 54471

(51) Int. Cl.
*G08G 5/02* (2006.01)
*B64C 19/00* (2006.01)
*G05D 1/06* (2006.01)

(52) U.S. Cl.
CPC *G08G 5/02* (2013.01); *B64C 19/00* (2013.01); *G05D 1/0676* (2013.01)

(58) Field of Classification Search
CPC ......... G08G 5/02; G05D 1/0676; B64C 19/00
USPC ........................................................... 701/4
See application file for complete search history.

(56) References Cited

U.S. PATENT DOCUMENTS

2009/0043434 A1* 2/2009 Deker .............................. 701/16
2011/0077858 A1* 3/2011 Coulmeau et al. ............. 701/204

OTHER PUBLICATIONS

Sopjes et al. "Continuous Descent Approaches with Variable Flight-Path Angles under Time Constraints", AIA Guidance, Navigation, and Control Conference, Aug. 8, 2011, pp. 1-20, American Institute of Aeronautics and Astronautics.*
Sopjes et al., "Continuous Descent Approaches with Variable Flight-Path Angles Under Time Constraints," AIA Guidance, Navigation, and Control Conference, Aug. 8, 2011, pp. 1-20, American Institute of Aeronautics and Astronautics.
Young, "Optimal Profile Descent with 4-D Trajectory," Integrated Communications, Navigation and Surveillance Conference (ICNS), Apr. 22, 2013, pp. 1-24, IEEE.
French Patent and Trademark Office, French Search Report for Application No. 13 54471, mailed Feb. 10, 2014.

* cited by examiner

*Primary Examiner* — Mary Cheung
*Assistant Examiner* — Yuen Wong
(74) *Attorney, Agent, or Firm* — Ingrassia Fisher & Lorenz, P.C.

(57) ABSTRACT

A method and device for automatically determining an optimized approach and/or descent profile for an aircraft are provided. The device comprises means for optimizing an approach and/or descent profile of an aircraft avoiding long and steep geometric segments, the device to this end inserting an idle segment, if it satisfies the restrictions, in the profile relating to the descent phase and/or to the approach phase, wherein said idle segment can be followed by a geometric segment.

5 Claims, 3 Drawing Sheets

METHOD AND DEVICE FOR AUTOMATICALLY DETERMINING AN OPTIMIZED APPROACH AND/OR DESCENT PROFILE

CROSS-REFERENCE TO RELATED APPLICATION

This application claims priority to French Patent Application No. 13 54471, filed May 17, 2013, which is incorporated herein by reference in its entirety.

TECHNICAL FIELD

The technical field relates to a method and a device for automatic determination of an optimised descent and/or approach profile for an aircraft.

BACKGROUND

It is known that, in order to construct a descent and/or approach profile for an aircraft, in particular a transport aeroplane, an FMS-type flight management system of the aircraft defines an optimised vertical profile by performing a backward calculation (i.e., progressing upward in altitude). This backward calculation is carried out on the basis of the runway threshold or, as a function of the approach geometry, from a usual point (such as a "missed approach point" or a "final end point") up to the cruise flight level (identified by a point TD ("Top of Descent")), taking account of speed and/or altitude constraints inserted into the flight plan. A deceleration point DECEL is likewise calculated by the FMS system. The point DECEL corresponds to the start of the deceleration towards the approach speed (VAPP). This point DECEL determines the limit between the descent and approach phases.

With this method of backward calculation, the first step is the calculation of the approach profile defined by: a final approach profile, calculated from the runway threshold up to a point FAF ("Final Approach Fix") or FAP ("Final Approach Point"). This final approach profile is determined in the usual way by a fixed gradient angle, corresponding to the final part defined in the procedure; and an intermediate approach profile from the point FAF/FAP towards the deceleration point DECEL. Along this intermediate profile, the aircraft starts the deceleration from the point DECEL (at the maximum speed, generally 250 knots, or at the lowest speed restriction which can be flown in clean configuration) until the final approach speed (VAPP) generally reached at a height of 1000 feet above the ground.

When the approach profile is defined, the FMS system starts the backward calculation of the descent profile from the point DECEL to the point TD. Taking account of altitude and/or speed restrictions defined in the flight plan, the descent profile is optimised for the reduction of noise and fuel consumption. To this end it includes: a so-called "geometric part" from the point DECEL to the last point where an altitude restriction impacts upon the definition of the descent profile. The geometric part is composed of a sequence of specific constant gradients, which make it possible to meet altitude restrictions. If no altitude restriction impacts on the descent profile, no geometric part is calculated; and a so-called "idle part" from the last restricting altitude restriction or from the point DECEL (if no geometric part exists) to said point TD. This part comprises a so-called "idle" segment along which the aircraft flies between two restrictions with an engine idling speed (which is beneficial for fuel consumption and noise).

The geometric part, if it exists, is composed, from the point DECEL backwards to the last altitude restriction, by a succession of straight segments (so-called geometric segments) defined each time between two points relating to altitude restrictions. This geometric portion is constructed in order to minimise the vertical maneuvers. In particular, if a straight segment makes it possible simultaneously to meet several restrictions, the corresponding part of the vertical profile is constructed by a single straight segment (geometric segment), instead of a plurality of short unaligned straight segments.

In addition, the FMS system usually associates a type with each geometric segment defined in the vertical profile. As a function of the performance levels of the aircraft and the status of the aircraft and external conditions (mass, centre of gravity, altitude, speed, wind conditions and temperature, . . . ) as well as of the gradient of the geometric segment in question, the aircraft exhibits a certain deceleration capacity along said geometric segment. The deceleration capacity defines the type of geometric segment: if the gradient of the geometric segment enables a sufficient deceleration in order that said segment can be flown in clean configuration (that is to say without the slats and flaps extended), said segment is a so-called "clean airbrake"; if the gradient of the geometric segment does not enable a sufficient deceleration in order that said segment can be flown in clean configuration but on the other hand enables it to be flown with "half airbrake", said segment is a so-called "half airbrake" segment; and if the gradient of the geometric segment does not enable a sufficient deceleration in order that said segment can be flown in clean configuration, even with half airbrake, said segment is called "too steep".

With the aforementioned usual logic used by the FMS system in order to calculate the profile, as the number of vertical maneuvers is minimised, certain geometric segments may potentially be very long and steep, in particular in environments which impose altitude restrictions far removed from one another (in terms of distance and altitude). These geometric segments do not allow a good deceleration capacity, in particular when they have a considerable gradient. This is one of the reasons for positioning of the point DECEL at high altitude.

The position of the point DECEL (that is to say the starting point of deceleration towards the approach speed) should be able to satisfy operational considerations. The approach should start at an altitude where the aircraft is supposed to start the deceleration towards the approach speed. A point DECEL which is too high is not adapted either to the manner in which the pilots are accustomed to perform the descent and the approach, nor to the speeds expected by the air traffic control at such altitude or distance from the final destination.

In addition, other objects, desirable features and characteristics will become apparent from the subsequent summary and detailed description, and the appended claims, taken in conjunction with the accompanying drawings and this background.

SUMMARY

According to various embodiments, the present disclosure provides a method for automatic determination of an optimised descent and/or approach profile for an aircraft, which enables the point DECEL to be positioned lower.

To this end, according to the various teachings of the present disclosure, said method according to which said profile comprises at least one of the following segments: a geometric segment and an idle segment, and is calculated backwards from a calculation starting point, said method comprising determining an idle segment in the case of absence of altitude and/or speed restriction, and in the case of presence of at least one altitude and/or speed restriction, of iteratively producing the following sequence of operations: determining an idle segment until the next restriction, with a backward calculation; verifying whether the idle segment thus determined satisfies this restriction, and: if said segment thus determined satisfies this restriction, restarting the iteration; and if said segment does not satisfy this restriction, calculating a geometric segment and incorporating it in the profile after, where appropriate, an idle segment which has satisfied the preceding restrictions.

Consequently, in order to optimise the descent and/or approach profile and to avoid a long and steep geometric segment, the calculation of the profile (backwards) consists of enabling an idle segment, which is followed (backwards) by a geometric segment.

Thus, instead of defining a long geometric segment which satisfies a maximum of restrictions, as long as this is possible, the present disclosure divides the descent/approach profile into a plurality of sub-segments (which may be idle segments or geometric segments). Also, instead of obtaining a long geometric segment, several sub-segments are obtained which satisfy successive restrictions with lower gradients offering better deceleration capacities (in particular with an idle segment). As such a profile enables better deceleration capacities, the deceleration point DECEL (where the deceleration towards the approach speed starts) is positioned nearer the destination and lower in altitude. This makes it possible to remedy the aforementioned drawback.

Furthermore, said process may comprise at least certain of the following steps, taken individually or in combination: a step consisting, if the determination of an idle segment creates directly upwards the calculation of a geometric segment which is too steep, of replacing these two segments on the profile by one single geometric segment; a step consisting, if the determination of a geometric segment creates directly upwards the calculation of a geometric segment which is too steep, of replacing these two segments on the profile by one single geometric segment; and a step consisting of replacing an idle segment in clean configuration by another idle segment for which the airbrakes are half extended. This other segment preferably presents a distribution of energy with a priority given to the potential energy.

The present disclosure also relates to a device for automatic determination of an optimised descent and/or approach profile for an aircraft, said profile comprising a least one of the following segments: a geometric segment and an idle segment.

According to the various teachings of the present disclosure, said device of the type configured in order to calculate said profile backwards from a calculation starting point and comprising at least means for determining an idle segment in the case of absence of altitude and/or speed restriction, is remarkable in that it also includes a calculation unit intended at least to define segments of the descent and/or approach profile and comprising at least the following means used at least in the case of presence of at least one altitude and/or speed restriction: a first means for determining an idle segment until the next restriction, with a backward calculation; a second means for verifying whether the idle segment predetermined by said first means satisfies the restriction, said first means determining a new idle segment until the next restriction, this being performed iteratively, if and as long as the segment obtained satisfies the restrictions; and a third means for calculating, if said second means consider that an idle segment does not satisfy a restriction, a geometric segment and incorporating it in the profile after, where appropriate, an idle segment which has satisfied the preceding restrictions.

Furthermore, said device may comprise at least certain of the following means, taken individually or in combination: means for replacing two geometric segments on the profile by one single geometric segment, if the determination of a geometric segment creates directly upwards the calculation of a geometric segment which is too steep; and means for replacing an idle segment in clean configuration by another idle segment for which the airbrakes are half extended.

The present disclosure also relates to a flight management system for an aircraft, which comprises a device for automatic determination of an optimised approach profile such as the aforementioned.

The present disclosure also relates to an aircraft, in particular a transport aeroplane, which is provided with such a device and/or such a system.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
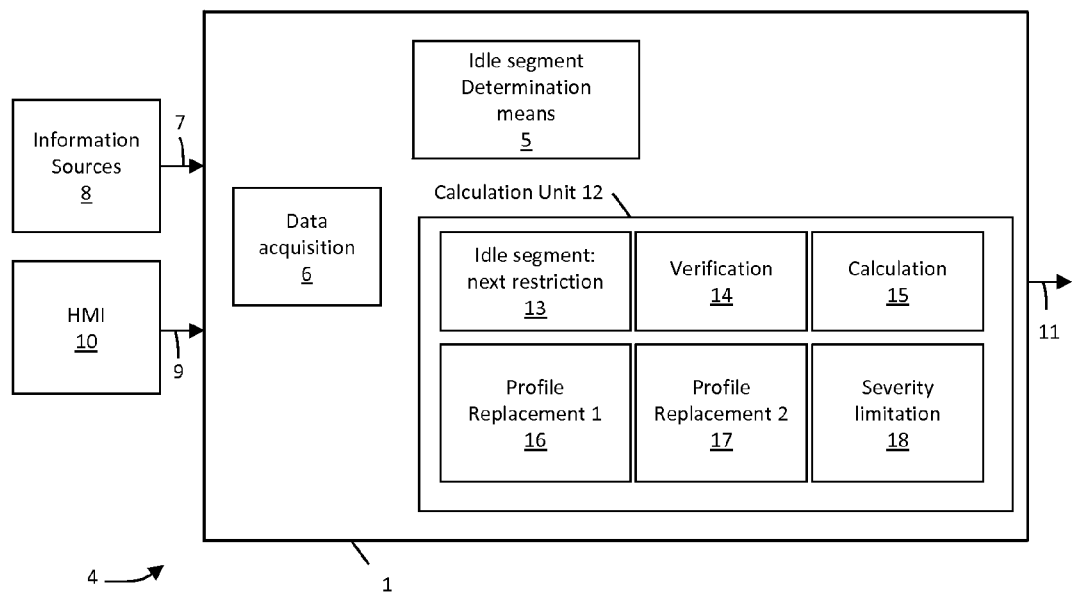
FIG. 1 shows a block diagram of a device which illustrates one embodiment according to the various teachings of the present disclosure.

The device 1 shown schematically in FIG. 1 and enabling illustration of the present disclosure is intended to determine automatically an optimised descent and/or approach profile P for an aircraft AC, in particular a transport aeroplane.

In one embodiment, said device 1 forms part of a flight management system 4 of the FMS ("Flight Management System") type, of the aircraft AC.

Figure 2:
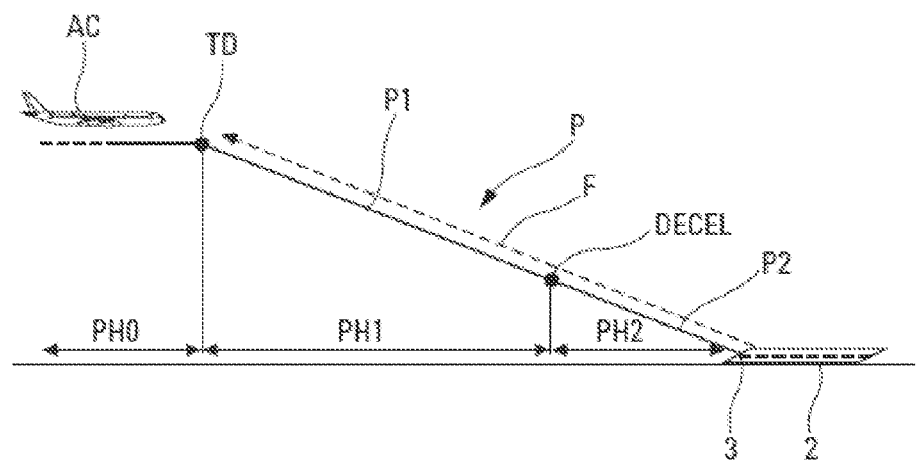
FIG. 2 shows a flight profile from a cruising altitude to landing.

As represented schematically in FIG. 2, during a flight of the aircraft AC with a view to landing on a landing runway 2, starting from a cruising phase PH0, the aircraft AC initiates a descent phase PH1 between a point TD and a point DECEL, according to a descent profile P1, followed by an approach phase PH2 between this point DECEL and a threshold 3 of the runway 2, according to an approach profile P2.

Figure 3:
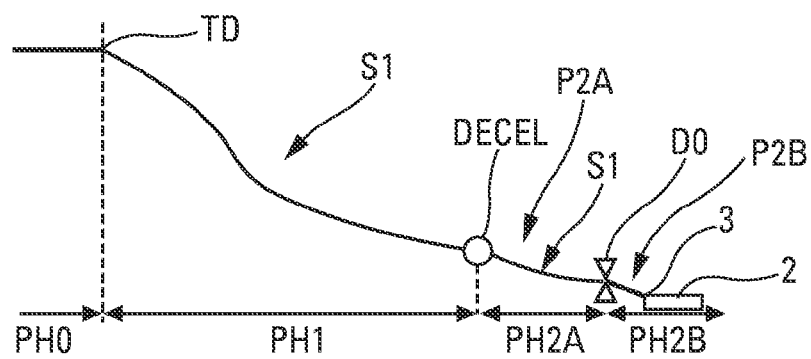
FIGS. 3 to 5 illustrate schematically profiles enabling explanation of the present disclosure.
Figure 4:
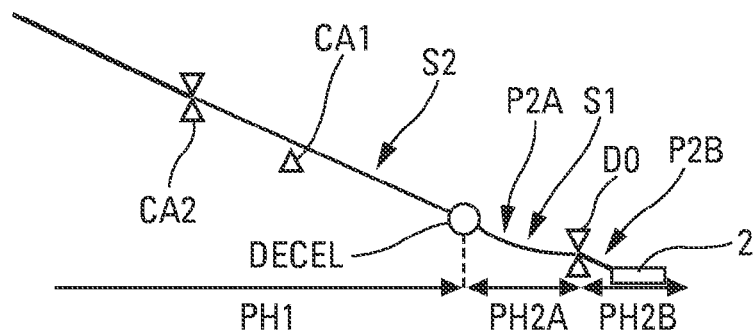
Figure 5:
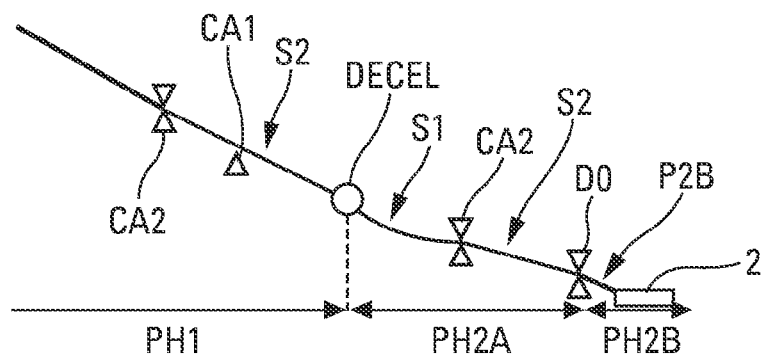

In the usual manner, this approach profile P2 comprises, as represented in particular in FIGS. 3 to 5: an intermediate approach profile P2A from the deceleration point DECEL to a point D0 for example a point FAF ("Final Approach Fix") or FAP ("Final Approach Point"). Along this intermediate profile P2A (corresponding to a part PH2A of the approach phase PH2), the aircraft starts the deceleration from the point DECEL (at the maximum speed, generally 250 knots, or at the lowest speed restriction which can be flown in clean configuration) until the final approach speed (VAPP) generally reached at a height of 1000 feet above the ground; and a final approach profile P2B from the point D0 (FAF or FAP) to the threshold 3 of the runway 2 (or to a usual point such as a "missed approach point" or a "final end point"). This final approach profile P2B (corresponding to a part PH2B of the approach phase PH2) has in the usual way a fixed gradient angle, corresponding to the final part defined in the procedure.

Said device 1 which is installed onboard the aircraft AC comprises in particular, as represented in FIG. 1, means 5 for determining an idle segment in the case of absence of altitude and/or speed restriction.

Said device 1 likewise comprises means 6 for acquisition of data, in particular: data received by means of a connection 7 of an assembly 8 of sources of information, which measure and/or determine current values pertaining to the aircraft AC (speed, altitude, etc.) and of external conditions (wind, temperature, etc.), and supply them via the connection 7; and data received by means of a connection 9 of a human/machine interface 10, which enables the flight crew to enter data and in particular the flight plan into the device 1.

Said means 8 and 10 can likewise form part of said device 1, which transmits the calculated profile P, via a connection 11, to usual user means or systems, for example calculators or display units (not shown), of which certain may form part of the device 1 and/or of the system 4.

Said device 1 is configured to calculate, in the usual way, the descent and/or approach profile P backwards from the threshold 3 of the runway 2 or to a usual point (such as a "missed approach point" or a "final end point"), as illustrated by an arrow F in FIG. 2.

According to the various teachings of the present disclosure, in order to calculate a descent and/or approach profile P optimising the position of the point DECEL for starting deceleration to the approach speed, said device 1 further includes a calculation unit 12 which is intended at least to calculate segments on the profile P and which comprises at least the following means (used at least in the case of presence of one or more altitude and/or speed restrictions): means 13 for determining an idle segment S1 to the next restriction, with a backward calculation; means 14 for verifying whether the segment S1 determined by said means 13 satisfies this restriction. The means 13 determines a new idle segment S1 to the next restriction, this being performed iteratively, if and as long as the segment obtained satisfies the restrictions; and means 15 for calculating, if said means 14 considers that an idle segment S1 does not satisfy a restriction, a geometric segment and incorporating it in the profile P after, where appropriate, an idle segment S1 which has satisfied the preceding restrictions.

Said calculation unit 12 therefore produces, iteratively, the following sequence of operations: determining an idle segment S1 to the next restriction; verifying whether the segment S1 thus determined satisfies this restriction, and: if said segment S1 satisfies this restriction, restarting the iteration; and if said segment S1 does not satisfy this restriction, calculating a geometric segment S2 and incorporating it in the profile P after, where appropriate, an idle segment which has satisfied the preceding restrictions.

An altitude restriction CA can be an altitude restriction CA1 according to which the aircraft must fly above a given altitude at a particular lateral position, or also an altitude restriction CA2 according to which the aircraft AC must fly at a given altitude at a particular lateral position.

The descent and/or approach profile P which is calculated by the device 1 therefore depends upon the presence or absence of restrictions. Thus, for an approach/descent without restriction, an idle segment S1 is defined, in the usual manner (with the aid of means 5), from the final capture altitude (point D0) to the last point TD of the cruise flight level, as represented in FIG. 3.

On the other hand, for an approach/descent with restriction, an idle segment S1 is defined as far as possible at each iteration, that is to say each time that the calculation of the profile encounters an altitude restriction. It then verifies whether the idle segment satisfies the restriction. In the affirmative, an idle segment is defined in the resulting profile P. On the other hand, if the idle segment does not satisfy published restrictions, the system returns to a geometric logic.

Consequently, in order to optimise the descent and/or approach profile P and to avoid a long and steep geometric segment, the calculation of the profile (backwards) implemented by the device 1 consists of enabling an idle segment S1, which is followed (backwards) by a geometric segment S2.

Thus, instead of obtaining a long geometric segment, several sub-segments are obtained which satisfy successive restrictions with lower gradients offering better deceleration capacities (in particular with an idle segment): as shown in FIG. 4, illustrating an example without altitude restriction in approach (phase PH2A); and as shown in FIG. 5, illustrating an example with an altitude restriction in approach (phase PH2A).

As such a profile P enables better deceleration capacities, the deceleration point DECEL (where the deceleration towards the approach speed starts) is positioned nearer the destination and lower in altitude.

The aforementioned means 13 to 15 of the device 1 make it possible to limit the number of long and steep geometric segments in order to reduce the altitude of the point DECEL.

Figure 6A:
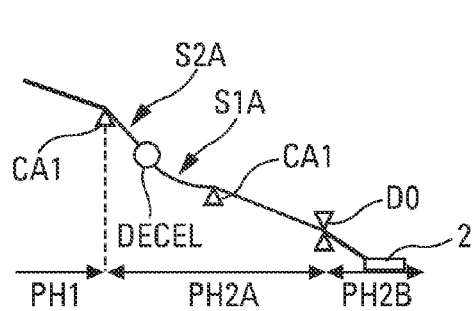
FIGS. 6A, 6B, 7A, 7B and 8 illustrate different profiles enabling explanation of various embodiments of the present disclosure.

Nevertheless, this implementation may, in certain cases, result in a negative effect. In fact, in defining a point DECEL at the end of an idle segment S1A, the segment S2A remaining between the point DECEL and the following altitude restriction CA1 (last segment of the descent flight phase) may, in certain situations, be too steep, as shown in FIG. 6A.

Figure 6B:
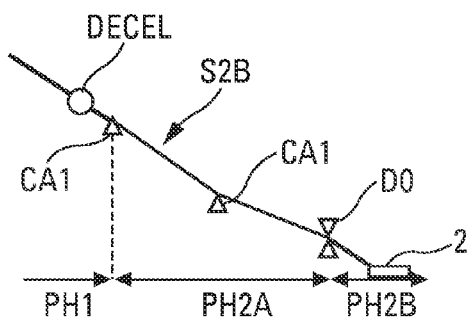

Also, in order to remedy this drawback, the device 1 comprises means 16 (which form part of the calculation unit 12) for replacing on the profile P, if the determination of an idle segment S1A creates directly upwards the calculation of a geometric segment S2A which is too steep, these two segments S1A and S2A by a single geometric segment S2B (which is not too steep) as far as possible, as shown in FIG. 6B.

Figure 7A:
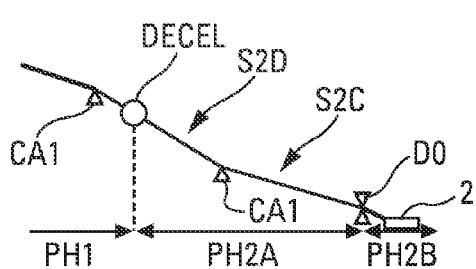
Figure 7B:
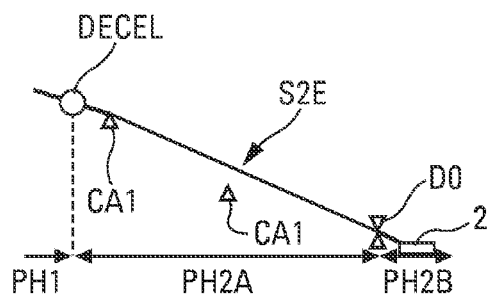

Moreover, by sub-dividing long geometric segments into multiple geometric segments, some of them are steeper than the original segment and may be too steep. Also, in order to remedy this latter drawback, the device 1 also comprises means 17 for replacing on the profile P, if the determination of a geometric segment S2C creates directly upwards the calculation of a geometric segment S2D which is too steep (as shown in FIG. 7A), these two geometric segments S2C and S2D by a single geometric segment S2E, as shown in FIG. 7B.

This geometric segment S2E has less of risk of being too steep.

Moreover, as indicated above, the device 1 makes it possible to reduce the altitude of the point DECEL but this implementation may, in certain cases, introduce segments which are too steep. Instead of trying to eliminate this type of segment (as the means 16 and 17 do), the device 1 likewise comprises means 18 which attempt to limit the severity of a segment which is too steep.

Figure 8:
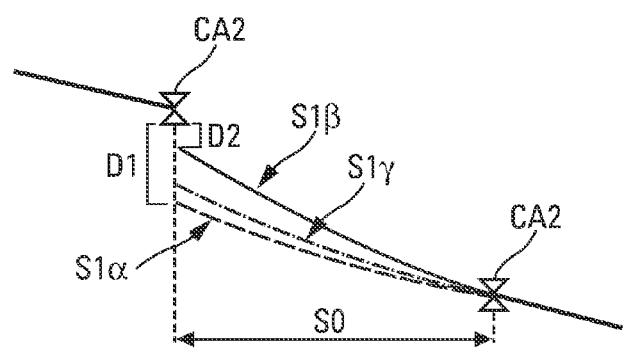

In order to do this, these means 18 replace an idle segment S1α in clean configuration with a normal distribution of the energy (segment S1α which is generated in a usual manner in the presence of a geometric segment which is too steep (along S0)), as shown in FIG. 8, by another idle segment S1β for which the airbrakes are half extended. This segment S1β is calculated in the usual manner, being based on a division of energy into potential energy and kinetic energy, which gives priority to potential energy.

The segments which are too steep are severe essentially when the discontinuity of altitude of the vertical profile is too great. This segment S1β is steeper than the segment S1α, which decreases the discontinuity of altitude which passes from D1 for S1α to D2 for S1β.

This FIG. 8 also shows a segment S1γ corresponding to an idle segment in clean configuration with a division of the energy giving priority to the potential energy.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method of automatic determination of an optimised descent or approach profile for an aircraft, the profile including at least one of following segments: a geometric segment, an idle segment, and is calculated backwards from a calculation starting point, said method comprising steps of:
   determining an idle segment in case of absence of at least one of an altitude and a speed restriction, and in case of presence of the at least one altitude and speed restriction, of iteratively performing a following sequence of operations:
      determining a second idle segment until to a next one of the at least one altitude and speed restriction with the backward calculation;
      verifying whether the second idle segment thus determined satisfies the next one of the at least one altitude and speed restriction, and:
         when said second idle segment thus determined satisfies the next one of the at least one altitude and speed restriction, restarting the iteration; and
         when said idle segment thus determined does not satisfy the next one of the at least one altitude and speed restriction, calculating a geometric segment and incorporating the geometric segment in the profile after an idle segment which has satisfied a preceding one of the at least one of altitude and speed restriction, the geometric segment being a straight segment defined between two points.

2. The method according to claim 1, wherein the method includes, when the determination of the idle segment creates directly upwards the calculation of the geometric segment which is too steep, replacing the idle segment and the geometric segment on the profile by one single geometric segment.

3. The method according to claim 2, wherein the method includes, when the determination of the geometric segment creates directly upwards the calculation of a second geometric segment which is too steep, replacing the geometric segment and the second geometric segment on the profile by one single geometric segment.

4. The method according to claim 1, according to which a geometric segment is too steep has been replaced by an idle segment in clean configuration, wherein the method includes replacing said idle segment in the clean configuration by another idle segment for which airbrakes are half extended.

5. The method according to claim 4, wherein said another idle segment presents a distribution of energy with a priority given to potential energy.

\* \* \* \* \*